Oct. 31, 1939.  E. R. BERLUTI  2,178,094
TRAILER HITCH
Filed July 9, 1936
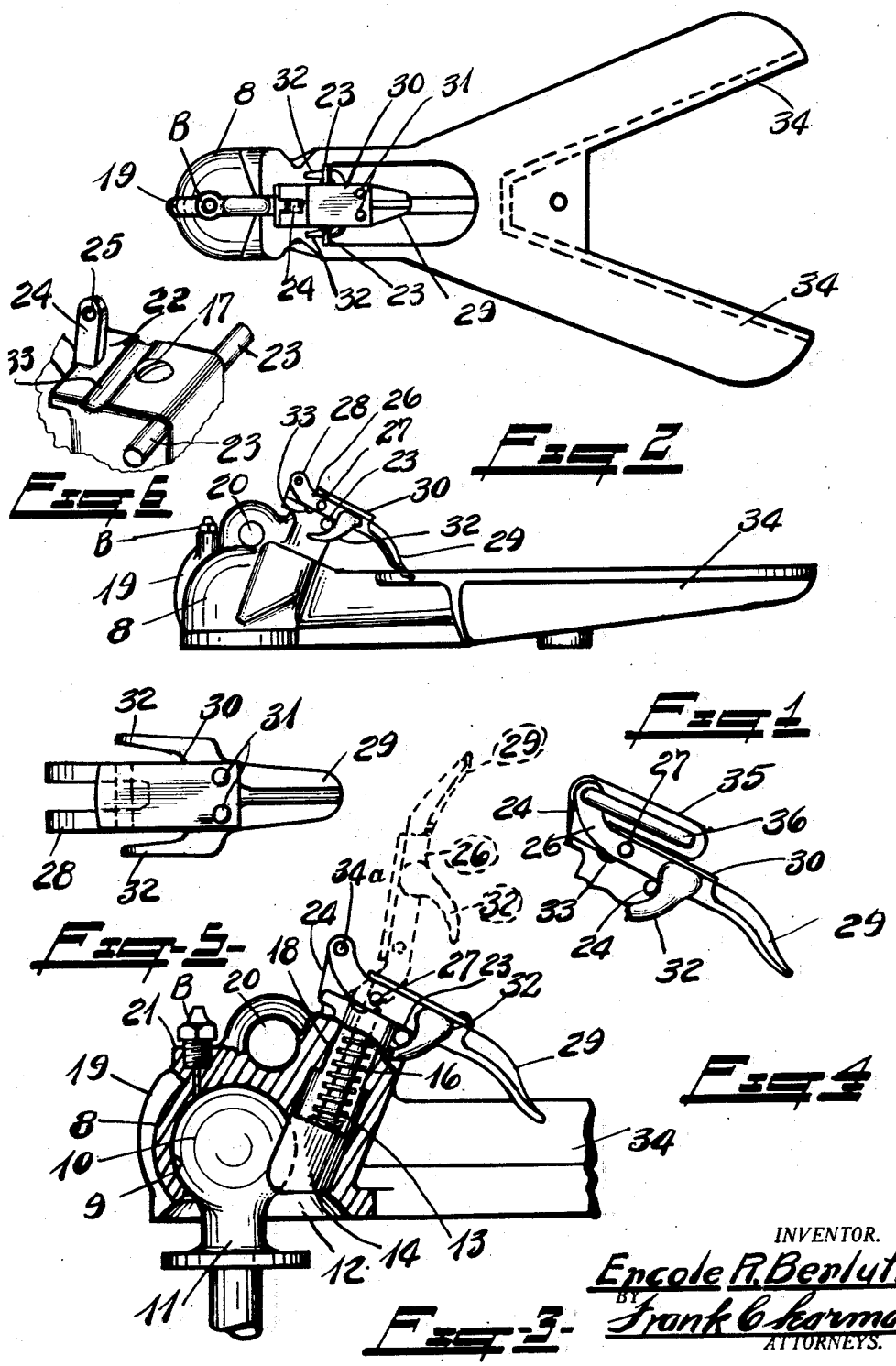
INVENTOR.
Ercole R. Berluti.
BY Frank C. Harman
ATTORNEYS.

Patented Oct. 31, 1939

2,178,094

UNITED STATES PATENT OFFICE 2,178,094

TRAILER HITCH

Ercole R. Beriuti, Saginaw, Mich., assignor of one-half to Max E. Dayton and one-half to Bay St. John, both of Rockford, Ill.

Application July 9, 1936, Serial No. 89,691

9 Claims. (Cl. 280—33.15)

This invention relates to trailer hitches, and more particularly to the means for locking the ball in the housing and/or holding said locking means in unlocked position to permit free removal or uncoupling of the ball from the housing.

One of the prime objects of the invention is to design a locking mechanism including means for positively securing the locking member in locking engagement with the ball bolt of the hitch.

Another object is to provide a locking mechanism, which in one position positively locks the locking member and ball in the housing, and which in another position automatically holds the locking member in retracted position so that the ball member can be easily inserted or withdrawn.

A further object is to provide a simple, practical and substantial locking mechanism which can be easily operated, which eliminates the possibility of accidental uncoupling of the hitch proper from the ball bolt, and which further eliminates the difficulty of manipulating and holding the mechanism in position to permit removal or insertion of the ball.

A still further object is to design a trailer hitch provided with means for locking and preventing its being uncoupled by an unauthorized person.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a side elevational view of a hitch showing the mechanism in locked position.

Fig. 2 is a top plan view.

Fig. 3 is an enlarged fragmentary part sectional view showing the ball locked in the housing and the locking mechanism in locked position, the broken lines showing the lever raised to retract the locking member.

Fig. 4 is a fragmentary side view showing the lever locked.

Fig. 5 is an enlarged top plan view of the locking lever.

Fig. 6 is a fragmentary isometric view showing the locking post etc.

Referring now to the drawing in which is shown one embodiment of my invention, the numeral 8 indicates a ball receiving shell or housing member the interior of which is suitably shaped as at 9 to receive the head 10 of the ball bolt 11 as usual. An opening 12 is provided in the lower face of the housing 8 and is considerably larger than the diameter of the ball, so that it is freely insertable into or removable from the housing when the locking member is retracted. An angularly disposed chamber 13 is provided directly adjacent the socket 9 and a locking plunger 14 is slidably mounted therein, the face of said plunger being shaped as at 15 to fit the curvature of the ball, and to hold said ball in position.

The upper end of the locking plunger 14 is reduced to form a cylindrical stem 16, and the free end of which projects through an opening 17 provided in the upper end of the shell, and a coil spring 18 is mounted on the cylindrical stem 16 and is interposed between the upper end of the chamber 13 and the shoulder end of the locking plunger 14.

A centrally disposed rib 19 is cast integral with and on the outer surface of the housing 8 and is shaped to form an eye 20, and for a purpose to be presently described. A boss 21 being provided on this rib and a grease fitting B is mounted therein so that lubricant may be forced into the socket 9 when desired. The rib which forms the eye 20 terminates in a flat inclined surface 22, having opposed laterally projecting ears 23 cast integral therewith. A post 24 is also cast integral and projects from the face of the surface 22, an opening 25 being provided in the end thereof and for a purpose to be presently described.

A locking lever 26 is mounted on this surface 22 and is pivotally connected to the plunger stem 16 by means of the pin 27, the front end being curved and forked as at 28, the rear end 29 leading downwardly for easy manipulation by the operator, and a plate 30 is secured on this lever by means of rivets 31, the end of the stem 16 resting against said plate.

Downwardly curved prongs 32 are provided on the lever 26 and when the mechanism is in locked position these prongs engage the ears 23, so that the lever 26 is firmly held in locked position, and when it is desired to actuate the locking plunger to release the ball bolt, the operator grasps the end 29 of the locking lever, forcing it upwardly to position as shown in broken lines in Fig. 3 of the drawing, and until the forked end 28 engages a groove 33 provided in the face of the housing, thus holding the locking lever in raised position and releasing the ball.

The ball is also freely insertable when the locking mechanism is in position as indicated in Fig. 3, and after the ball has been inserted, the lever 26 is swung down, the prongs 32 engaging the ears 23 on the housing, the plunger 14 moving downwardly so that the section 15 engages the ball 10, the spring 18 together with the engagement of the prongs with the ears 23 firmly locking the plunger in position and the ball against the removal.

Rearwardly projecting diverging legs 34 are cast integral with the housing and are adapted to be attached to the tongue or other draft members of the trailer (not shown).

The plate 30 assists in holding the lever in its raised position inasmuch as it lies parallel with the stem when it is in raised position and must be sprung outwardly when the lever is swung down.

In certain states it is necessary to also chain the hitch to the power vehicle, and I have therefore provided the opening or eye 20 and which is formed by the rib 19 and which also reinforces the shell, the chain (not shown) can be hooked in or passed through this eye, the ends leading to the frame or bumpers of the power vehicle.

The hitch can be locked against operation by unauthorized persons if desired, openings 34a being provided in the ends of the forked lever 26 and these openings are in alignment with the opening 25 in the post 24 so that the hasp 35 of a lock 36 can be inserted through these openings to securely lock the lever in position.

From the foregoing description it will be obvious that I have perfected a very simple, practical and economical hitch for trailers and the like.

What I claim is:

1. A trailer hitch comprising a housing, a ball member mounted therein, an angularly disposed locking plunger mounted in said housing and having a concave face engageable with said ball for securing it in position, a pronged lever mounted on said housing and having pivotal connection with said plunger at a point intermediate its length, said lever when in one position, being engageable with said housing to secure the locking plunger in position and hold the ball in its locked position, and in another position to hold the plunger in raised position to permit free removal of said ball.

2. A trailer hitch comprising a housing, a ball member engageable in said housing, an angularly disposed locking plunger slidably mounted in the housing and formed with a concave face to fit the curvature of the ball, and a locking lever pivotally connected to the plunger member and provided with prongs adapted to releasably engage said housing to secure the plunger in its locked position.

3. A trailer hitch comprising a housing, a ball member mounted for universal movement therein, an angularly disposed locking plunger mounted in said housing and provided with a concave shaped face to fit the contour of the ball, resilient means for forcing said plunger into engagement with the ball, and a locking lever pivotally connected to said plunger at a point intermediate its length and adapted in one position to positively lock said plunger in engagement with the ball, and in another position to hold plunger in raised position to permit the free insertion or removal of the ball from the housing.

4. A trailer hitch comprising a housing, a ball member mounted for universal movement therein, an angularly disposed locking plunger mounted in said housing and formed with a stem projecting through the housing shell, the face of the plunger being shaped to fit the contour of the ball, a lever mounted on the housing and pivotally connected to said stem, prongs on said lever and detachably engaging said housing when the lever is in locked position, said lever forcing said plunger upwardly and out of engagement with the ball when swung to its raised unlocked position.

5. A trailer hitch of the class described and comprising a main shell, a ball member mounted for universal movement therein, an angularly disposed plunger member mounted in said shell directly adjacent the ball member and formed with a concave shaped face to fit the contour of the ball, a stem on the plunger and projecting beyond the shell, a locking lever pivotally connected to the plunger at a point intermediate its length and provided with prongs adapted to engage said shell to positively lock said plunger in position, said lever disengaging from said shell and raising said plunger out of locking engagement with the ball when the lever is swung to its raised position.

6. A trailer hitch of the class described and comprising a housing, a ball mounted for universal movement therein, an angularly disposed locking plunger slidably mounted on said housing at a point directly adjacent the ball and having one face shaped to fit the contour thereof, a stem on the plunger and projecting through the shell of the housing, laterally projecting ears on said housing, a locking lever mounted on the housing and pivotally connected to the stem at a point intermediate its length, prongs on the locking lever and releasably engaging said ears when the plunger is in its locked position, an upwardly curved front end section on the lever, a groove in the housing, and forming a seat for the upwardly curved end section when the locking lever is swung upwardly to its raised position to release the ball.

7. A trailer hitch of the class described and comprising a housing, a ball member mounted for universal movement therein, an angularly disposed spring pressed, plunger member mounted in said housing and formed with a concave shaped face to fit the curvature of said ball and having pivotal connection with the plunger stem, ears on said housing, and prongs on said lever for releasably engaging said ears to hold the lever in its locked position, and resilient means on said lever for assisting in holding it in its raised position when the lever is swung upwardly to raise said plunger and release said ball.

8. A trailer hitch comprising a housing, a ball member mounted for universal movement therein, a plunger mounted in said housing for locking said ball in position and movable to locked or unlocked position to secure the ball in the socket or permit the removal thereof, a locking lever connected to the plunger at a point intermediate its length, and aligned openings in said housing and lever respectively to accommodate a lock for locking the lever to the housing to prevent manipulation of said locking lever.

9. A trailer hitch comprising a housing, a ball member mounted for universal movement therein, an angularly disposed locking plunger slidably mounted in the housing and formed to fit the curvature of the ball, a locking lever pivotally connected to the plunger member at a point intermediate its length and provided with prongs adapted to releasably engage said housing, and means on said lever and housing for accommodating a lock to prevent unauthorized manipulation of said plunger.

ERCOLE R. BERLUTI.